(12) United States Patent
Eberlein et al.

(10) Patent No.: US 11,687,670 B2
(45) Date of Patent: Jun. 27, 2023

(54) CORRELATING EXPERIENCE DATA AND OPERATIONS DATA WITHOUT COMPROMISING ANONYMITY

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 574 days.

(21) Appl. No.: 16/923,243

(22) Filed: Jul. 8, 2020

(65) Prior Publication Data

US 2022/0012361 A1 Jan. 13, 2022

(51) Int. Cl.
*G06F 21/00* (2013.01)
*G06F 21/62* (2013.01)
*G06F 17/15* (2006.01)
*G06F 17/16* (2006.01)

(52) U.S. Cl.
CPC .......... *G06F 21/6254* (2013.01); *G06F 17/15* (2013.01); *G06F 17/16* (2013.01)

(58) Field of Classification Search
CPC ....... G06F 21/6254; G06F 17/15; G06F 17/16
See application file for complete search history.

(56) References Cited

U.S. PATENT DOCUMENTS

| 8,255,393 | B1 * | 8/2012 | Yu | H04W 4/029 |
| | | | | 707/724 |
| 2011/0295722 | A1 * | 12/2011 | Reisman | G06Q 30/0641 |
| | | | | 705/26.1 |
| 2014/0075004 | A1 * | 3/2014 | Van Dusen | G06Q 50/01 |
| | | | | 709/223 |
| 2014/0089049 | A1 * | 3/2014 | Cristofaro | G06Q 30/0203 |
| | | | | 705/7.32 |
| 2019/0205567 | A1 * | 7/2019 | Shelton, IV | G06F 21/6254 |
| 2019/0220863 | A1 * | 7/2019 | Novick | G06Q 20/10 |
| 2020/0249660 | A1 * | 8/2020 | Rao | G05B 19/0428 |

OTHER PUBLICATIONS

Moxey et al. "Hypercomplex correlation techniques for vector images", IEEE Transactions on Signal Processing, vol. 51 Issue: 7, July (Year: 2003).*

* cited by examiner

*Primary Examiner* — Morshed Mehedi
(74) *Attorney, Agent, or Firm* — Fish & Richardson P.C.

(57) ABSTRACT

Methods, systems, and computer-readable storage media for determining an initial distribution based on a set of survey boundaries and historical O-data, the historical O-data being generated through execution of a computer-implemented service, the historical distribution including a first set of parameter ranges and a second set of parameter ranges defining a set of range cells, adjusting one or more parameters ranges of at least one of the first set of parameter ranges and the second set of parameter ranges, determining an adjusted distribution defining a range space for a computer-based survey, receiving X-data from a set of users participating in the computer-based survey, the X-data including responses of users in the set of users provided to the computer-based survey, providing a set of X-data to O-data range vector correlations, and executing analytics of the computer-implemented service based on the set of X-data to O-data range vector correlations.

20 Claims, 10 Drawing Sheets

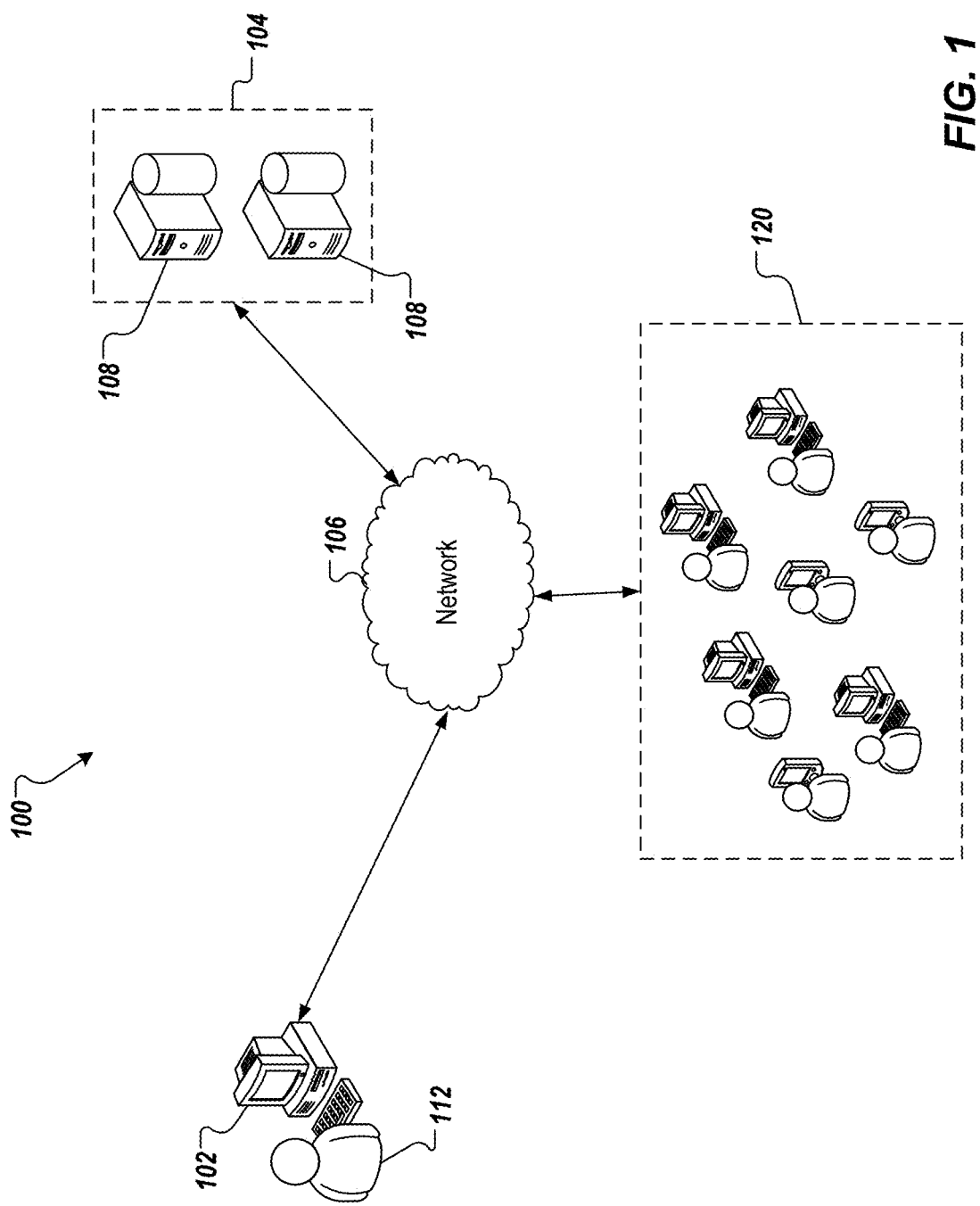

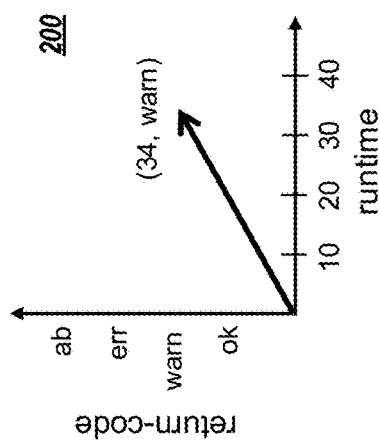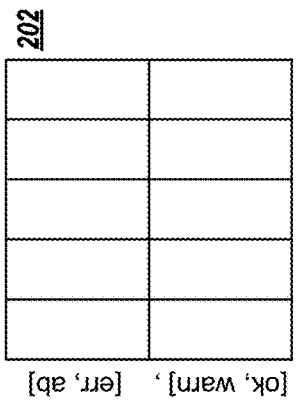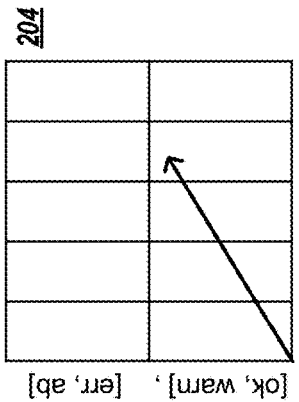
FIG. 2A
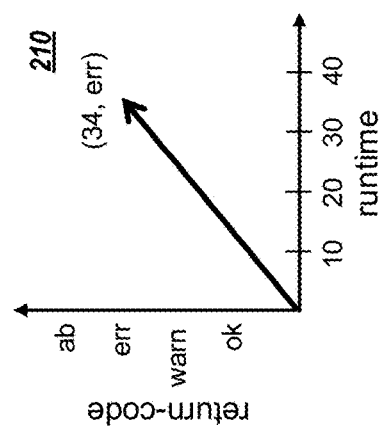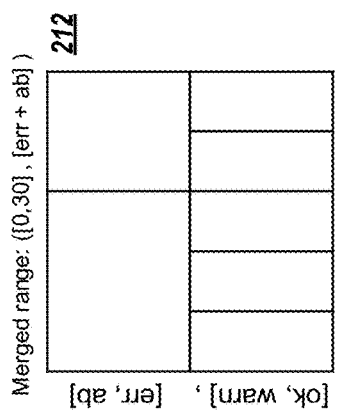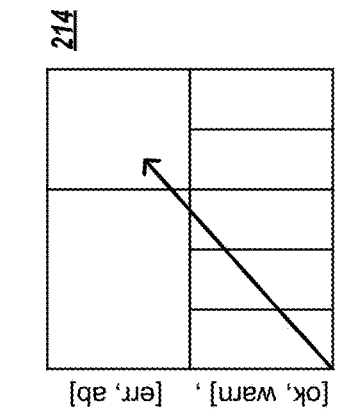
FIG. 2B

FIG. 3A — 300

| Execution Return-Code | Procedure Runtime | | | | |
|---|---|---|---|---|---|
| | 0 - 10 | 10 - 20 | 20 - 30 | 30 - 40 | > 40 |
| Procedure Failure [error, abort] | 3.9 | 7.4 | 9.8 | 8.8 | 5.1 |
| Procedure Success [OK, warn] | 10.7 | 64.1 | 149.2 | 120.7 | 20.3 |

FIG. 3B — 302

| Execution Return-Code | Procedure Runtime | | | | |
|---|---|---|---|---|---|
| | 0 - 10 | 10 - 20 | 20 - 30 | 30 - 40 | > 40 |
| Procedure Failure [error, abort] | | 21.1 | | 13.9 | |
| Procedure Success [OK, warn] | 10.7 | 64.1 | 149.2 | 120.7 | 20.3 |

CORRELATING EXPERIENCE DATA AND OPERATIONS DATA WITHOUT COMPROMISING ANONYMITY

BACKGROUND

Enterprises provide computer-implemented services to consumers. For example, and without limitation, enterprises provide software systems (e.g., on-premise, cloud-based) and/or infrastructure (e.g., infrastructure-as-a-service). Software systems can be executed within a landscape that can include computing devices, servers (e.g., application servers, web servers), datastores (e.g., database systems), and the like. Consumer use of such computer-implemented services results in generation and storage of operational data. Operational data can be described as, without limitation, data representative of execution of functionality of software systems within a landscape (e.g., procedure success, procedure failure, execution codes (return-codes), execution run-times, issue ticket processing time, numbers of re-tries).

In provisioning computer-implemented services, enterprises seek to improve service offerings by soliciting feedback from users of the services to assess the performance of services. Such feedback can be referred to as experience data, which represents a user's assessment of their experience with the service(s). Assessing the performance of a computer-implemented service can include correlating the experience data received from users to operations data recorded within the landscape. However, such correlation can result in revealing individual users as a source of experience data. That is, correlation can result in an identity of a user being revealed or determinable, implying data privacy issues and/or chilling user willingness to provide feedback.

Accordingly, in computer-executed services, a challenge is to relate experience data and operational data in a consistent and predictable way that guarantees anonymity for users providing feedback (i.e., anonymity for the sources of the experience data). For example, data analysts run correlations and perform analytics on operations data for certain feedback sets (experience data), but it is to be ensured that experience data and the operational data are not related on an individual record level, for example, which would result in identification of users.

Traditional analytics platforms do not support relate experience data and operational data in a generic way that would ensure user anonymity. Instead, traditional approaches include surveys soliciting experience data being at least partially run by a third-party data collectors in order to provide anonymity. Such approaches seek to achieve anonymity by removing surveys from the results that could otherwise be used to identify individual users. However, this comes with additional costs including, for example, a delay between survey design and result consumption, a reduction in the set of usable data, and trust that the third-party data collector adequately performs.

SUMMARY

Implementations of the present disclosure are directed to correlating operational data to experience data. More particularly, implementations of the present disclosure are directed to an anonymity-preserving data analysis platform for analyzing operations of one or more computer-implemented services by correlating operational data and experience data, while preserving anonymity of sources of experience data.

In some implementations, actions include determining, by an anonymity-preserving data analysis platform, an initial distribution based on a set of survey boundaries and historical O-data, the historical O-data being generated through execution of a computer-implemented service, the historical distribution including a first set of parameter ranges and a second set of parameter ranges defining a set of range cells, adjusting, by the anonymity-preserving data analysis platform, one or more parameters ranges of at least one of the first set of parameter ranges and the second set of parameter ranges, determining, by the anonymity-preserving data analysis platform, an adjusted distribution defining a range space for a computer-based survey, receiving, by the anonymity-preserving data analysis platform, X-data from a set of users participating in the computer-based survey, the X-data including responses of users in the set of users provided to the computer-based survey, providing a set of X-data to O-data range vector correlations, and executing analytics of the computer-implemented service based on the set of X-data to O-data range vector correlations. Other implementations of this aspect include corresponding systems, apparatus, and computer programs, configured to perform the actions of the methods, encoded on computer storage devices.

These and other implementations can each optionally include one or more of the following features: each X-data to O-data range vector correlation is provided by determining an O-data parameter vector for a user in the set of users, the O-data parameter vector corresponding to X-data provided by the user, determining an O-data range vector by mapping the O-data parameter vector to the range space of the adjusted distribution, and correlating the X-data to the O-data range vector; adjusting one or more parameters ranges of the initial distribution is executed in response to determining that each of the one or more parameter ranges exceeds an anonymity limit level; adjusting the one or more parameter ranges comprises merging at least two parameter ranges; adjusting the one or more parameter ranges comprises splitting a parameter range; the user is identifiable from the O-data parameter vector and is unidentifiable from the O-data range vector and X-data; and executing analytics includes querying an O-data database for additional O-data at least partially based on the O-data range vector.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 1 depicts an example architecture that can be used to execute implementations of the present disclosure.

FIGS. 2A and 2B depict example graphical representations of parameter space, parameter vectors, range space, and range vectors in accordance with implementations of the present disclosure.

FIG. 3A depicts an example statistical distribution.

FIG. 3B depicts the example statistical distribution of FIG. 3A including merged cells.

Like reference symbols in the various drawings indicate like elements.

DETAILED DESCRIPTION

Figure 4A:
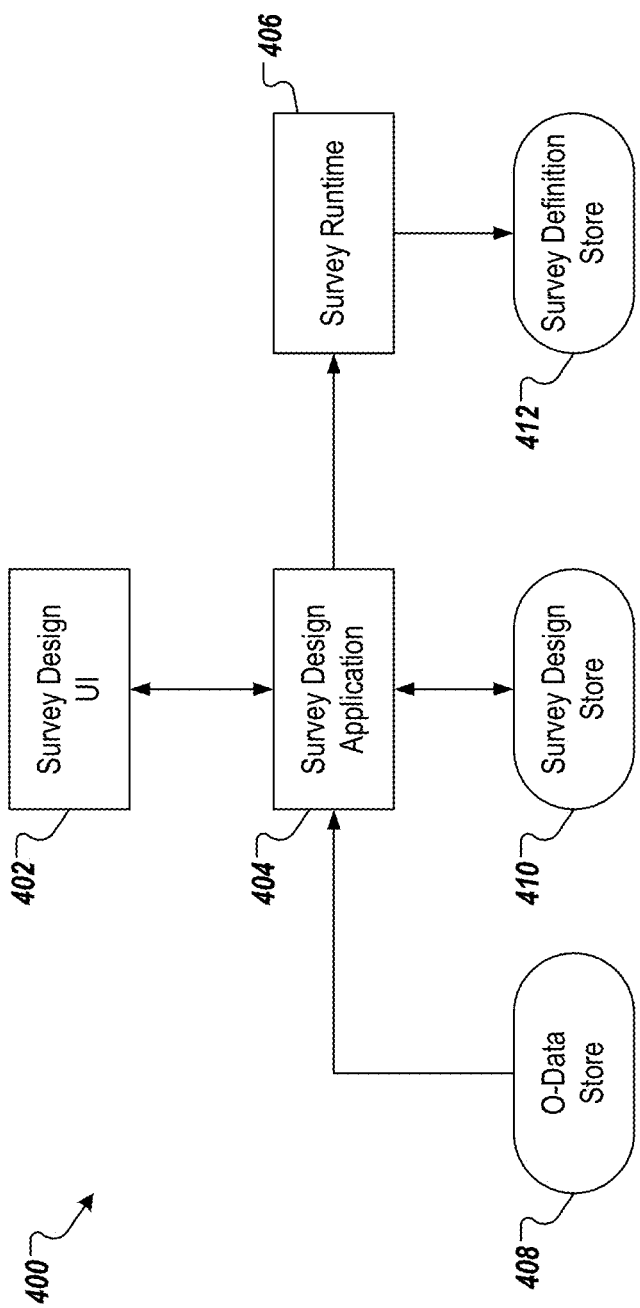
FIG. 4A depicts an example design-time conceptual architecture in accordance with implementations of the present disclosure.

Implementations of the present disclosure are directed to correlating operational data to experience data. More particularly, implementations of the present disclosure are directed to an anonymity-preserving data analysis platform for analyzing operations of one or more computer-implemented services by correlating operational data and experience data, while preserving anonymity of sources of experience data. Implementations can include actions of determining an initial distribution based on a set of survey boundaries and historical O-data, the historical O-data being generated through execution of a computer-implemented service, the historical distribution including a first set of parameter ranges and a second set of parameter ranges defining a set of range cells, adjusting one or more parameters ranges of at least one of the first set of parameter ranges and the second set of parameter ranges, determining an adjusted distribution defining a range space for a computer-based survey, receiving X-data from a set of users participating in the computer-based survey, the X-data including responses of users in the set of users provided to the computer-based survey, providing a set of X-data to O-data range vector correlations, and executing analytics of the computer-implemented service based on the set of X-data to O-data range vector correlations.

To provide further context for implementations of the present disclosure, and as introduced above, enterprises provide computer-implemented services to consumers. For example, and without limitation, enterprises provide software systems (e.g., on-premise, cloud-based) and/or infrastructure (e.g., infrastructure-as-a-service). Software systems can be executed within a landscape that can include computing devices, servers (e.g., application servers, web servers), datastores (e.g., database systems), and the like. Consumer use of such computer-implemented services results in generation and storage of operational data. Operational data can be described as, without limitation, data representative of execution of functionality of software systems within a landscape (e.g., procedure success, procedure failure, execution codes (return-codes), execution runtimes, issue ticket processing time, numbers of re-tries).

In provisioning computer-implemented services, enterprises seek to improve service offerings by soliciting feedback from users of the services to assess the performance of services. Such feedback can be referred to as experience data, which represents a user's assessment of their experience with the service(s). Assessing the performance of a computer-implemented service can include correlating the experience data received from users to operations data recorded within the landscape. However, such correlation can result in revealing individual users as a source of experience data. That is, correlation can result in an identity of a user being revealed or determinable, implying data privacy issues and/or chilling user willingness to provide feedback.

Accordingly, in computer-executed services, a challenge is to relate experience data and operational data in a consistent and predictable way that guarantees anonymity for users providing feedback (i.e., anonymity for the sources of the experience data). For example, data analysts run correlations and perform analytics on operations data for certain feedback sets (experience data), but it is to be ensured that experience data and the operational data are not related on an individual record level, for example, which would result in identification of users.

Traditional analytics platforms do not support relate experience data and operational data in a generic way that would ensure user anonymity. Instead, traditional approaches include surveys soliciting experience data being at least partially run by a third-party data collectors in order to provide anonymity. Such approaches seek to achieve anonymity by removing surveys from the results that could otherwise be used to identify individual users. However, this comes with additional costs including, for example, a delay between survey design and result consumption, a reduction in the set of usable data, and trust that the third-party data collector adequately performs.

Further, correlation of experience data and operational data is cumbersome from the perspective of technical resources (e.g., processors, memory) expended and can require individual development. For example, operational data and experience data are collected and stored in different systems and it is difficult to relate the data sets. One solution includes simply adding a unique identifier (ID) correlating operational data and experience data. However, this would indirectly reveal the user that created the operational data when analyzing individual experience data. That is, such an approach is too fine-grained enabling user identities to be revealed.

Accordingly, enterprises seek to guarantee anonymity of users that provide experience data during analysis that is based on the experience data. Even if no unique ID is added to the experience data, it should be ensured that the parameters related to the survey do not enable inference of user identities. For example, if, for an employee survey, a manager has only 5 direct reports and there is a question on "employee-age" or "time-with-company," there may be a case where there are only 1-2 employees in the different ranges (e.g., <1 year, 1-5 years, >5 years). With this information, it can be determined who returned a specific survey response.

In view of the above context, implementations of the present disclosure provide an anonymity-preserving data analysis platform that enables the use of user feedback surveys relating to operational data (referred to herein as O-data) in a way that experience data (referred to herein as X-data), which results from the user feedback surveys, can be analyzed without compromising anonymity of users providing the experience data. More particularly, implementations of the present disclosure enable the O-data and the X-data to be correlated and evaluated in the context of parameters of the O-data without compromising the anonymity of survey participants. Implementations of the present disclosure support defining of a parameter space of the O-data in a way that statistical user anonymity can be forecasted for a given number of survey participants based on historical O-data and/or ad-hoc O-data that is evaluated for a defined parameter range space. Analysis of the combined data (X-data+O-data) with analytical software is implemented based on a range vector to correlate defined O-data range cells with survey statistics. Further, implementations of the present disclosure enable analysis to be extended to include additional O-data associated with the originally defined range vectors.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, the server system 104 can include at least a portion of a landscape, in which one or more computer-implemented services (e.g., computer-executable applications) are executed. In some examples, a user group 120 includes multiple users, each of which interacts with at least one computer-implemented service provisioned within the server system 104. As introduced above, O-data is generated as a result of execution of the computer-implemented services within the server system.

In accordance with implementations of the present disclosure, the server system 104 (or another server system not depicted in FIG. 1) can host an anonymity-preserving data analysis platform that enables data analysis based on correlating O-data to X-data, which results from user feedback surveys, without compromising anonymity of users providing the X-data. For example, and as described in further detail herein, the anonymity-preserving data analysis platform enables a user, such as the user 112, to design a computer-based survey in an anonymity-preserving manner, distribution of the computer-based survey to a set of users (e.g., at least a portion of the users in the user group 120), receipt of X-data from user input to the computer-based survey, and analysis based on correlating O-data and X-data.

Implementations of the present disclosure are described in further detail herein with non-limiting reference to example O-data and example X-data. It is contemplated, however, that implementations of the present disclosure can be realized with any appropriate O-data and any appropriate X-data.

In accordance with implementations of the present disclosure, the anonymity-preserving data analysis platform correlates O-data and X-data to enable an enterprise, which provides computer-implemented services to consumers, to gain deeper insight into user experience and assessment of that experience. An example of correlation can include, without limitation, satisfaction was lower in a group of users that experienced higher response times, because they were using a service on a remote data center with higher latency. In this example, lower satisfaction (X-data) is correlated with the service executing on remote data center with higher latency (O-data). Consequently, the enterprise can determine that the lower satisfaction resulted from the latency of executing the service in a remote data center.

As introduced above, a challenge is to relate X-data and O-data in a consistent and predictable way that guarantees anonymity for users providing feedback (i.e., anonymity for the sources of the X-data). Data analysts should be able to run correlations and do analytics on O-data for certain feedback sets, but it is to be ensured that X-data and O-data are not related on an individual record level, for example, which would result in identification of users. In view of this, implementations of the present disclosure enable datasets (parameter ranges) to be defined based on historical O-data and/or ad hoc O-data that are large enough to prevent matching a specific survey result (X-data) to the user that experienced or created the corresponding O-data.

In further detail, in some implementations, historical O-data and/or ad hoc O-data is used to derive requirements of a statistical sample and a granularity, on which X-data resulting from a computer-based survey can be analyzed. For example, if a survey shall be correlated with Y parameters (e.g., 5 parameters) in O-data, a Y-dimensional space is opened and each user taking part in the survey can be related to a vector in the Y-dimensional space. By way of non-limiting example, parameters can include a runtime and a return-code having one of multiple different values, such as, OK, warning, error, and abort, as discussed in further detail herein. However, even when using a vector with multiple dimensions, user identity could still be inferred.

In view of this, implementations of the present disclosure provide parameter ranges for O-data and only correlate X-data with the parameter ranges in the Y-dimensional range space. As described in further detail herein, historical statistics is used to derive a number of participants (users) required to take part in the survey, such that, for each range there is a minimum number of responses expected, or that the parameter ranges are to be adjusted (e.g., coarser grained). In this manner, the computer-based survey is configured to enable statistical anonymity of users (if the statistical distribution is the same as in history). If there is sufficient time between collecting O-data and sending out the survey, the actual O-data (referred to as ad hoc O-data) can be used in defining the computer-implemented survey. While this can provide improved analysis, using only historical O-data can provide sufficient precision.

Implementations of the present disclosure also account for a return rate, which can be described as a percentage of users completing the survey compared to a number of users the survey is sent to, and an anonymity limit level, which can be described as a sample size per range-cell to provide statistical anonymity. With an anticipated return rate and the anonymity limit level, the number of users that the computer-based survey is to be sent to can be determined to achieve the anonymity limit level for range-cells with low historic data points. It can be noted that this is a different aspect than the statistical significance. More particularly, the computer-based survey is also designed to achieve a certain sample-size to get statistically meaningful results. Implementations of the present disclosure focus on the number of users required to achieve statistical anonymity for each user partaking in the survey independent of achieving statistical significance. In this sense, the number of users required to achieve statistical anonymity for each user partaking in the survey can be described as a minimum number of users.

In some implementations, a user can be assigned to a vector in the multi-dimensional range space, the vector being referred to as a range vector, which is distinct from a multi-dimensional parameter vector, described herein. The range vector is used for the survey. When the survey is executed, the result is correlated to the range vector. This set is stored in a survey database (DB) (e.g., range vector and survey results). For a specific range cell that the range vector points to, at least an anonymity limit level-number of surveys are expected to be captured.

FIGS. 2A and 2B depict example graphical representations of parameter space, parameter vectors, range space, and range vectors in accordance with implementations of the present disclosure. As described in further detail herein, range vectors, such as the example of FIGS. 2A and 2B, are used to indirectly correlate X-data from surveys with O-data to preserve anonymity.

The examples of FIGS. 2A and 2B are based on example parameters, which include runtime (rt) and return-code (rc). In some examples, runtime represents a time required for a computer-executable procedure (process) to execute (e.g., time measured in millisecond (ms) or seconds (s)). In some examples, return-code indicates a result of execution of the procedure. The return-code provided for a procedure includes one of multiple values. Example values include OK, warning (warn), error (err), and abort (ab). In some examples, values of OK and warning indicate that the procedure was executed successfully. In some examples, values of error and abort indicate that the procedure failed (i.e., unsuccessful).

With particular reference to FIG. 2A, an example graph 200 depicts an example parameter space and an example parameter vector, an example graph 202 depicts an example range space, and an example graph 204 depicts an example range vector within the range space. In the example graph 200, the parameter vector represents O-data for execution of a particular process defined as (rt, rc)=(34, warn). This represents that a procedure was successfully executed as represented by O-data including a runtime of 34 and a return-code of warning. This execution can be associated with a user (e.g., the user that initiated execution of the procedure). Accordingly, the parameter vector can be described as defining variables in O-data that can be used to correlate with the X-data (e.g., feedback that the user provides in view of the runtime and return-code resulting from the procedure that the user initiated).

The example graph 202 depicts a range space based on the parameters of the example graph 200. In some examples, the range space can be described as a multi-dimensional space out of an array of ranges for each parameter. In the depicted example, the range space includes ranges of [0-10], [10-20], [20-30], [30-40], and [>40] for runtime, and ranges of [OK+warning] and [error+abort] for return-code. In this manner, the example graph 202 includes range cells of ([OK+warning], [0-10]), ([OK+warning], [10-20]), etc., and range cells of ([error+abort], [0-10]), ([error+abort], [10-20]), etc. In some examples, a range cell specifies a multi-dimensional range in the range space.

The example graph 204 depicts an example range vector corresponding to the example parameter vector (rt, rc)=(34, warn) of the example graph 200. Here, the range vector is provided as ([30-40], [OK, warn]), because rt=34 lands within the range [30-40] and rc=warn lands within the range [OK, warn]. The range vector can be described as an O-data vector associated with a user, which is mapped to a range cell.

It can occur, however, that a range cell is deficient in providing anonymity. For example, ranges that define the range cell can be too granular, such that X-data correlated to O-data landing in the range cell can result in leakage of the identity of the user that is associated with the O-data. For example, if a range vector of a user is the only range vector landing in the range cell, the identity of the user can be determined (e.g., the user provides X-data and, because the user is the only user having a range vector landing in the range cell, the user identity can be determined). Consequently, range cells can be merged to provide a larger, more coarse-grained range cell.

With particular reference to FIG. 2B, an example graph 210 depicts an example parameter space and an example parameter vector, an example graph 212 depicts an example range space, and an example graph 214 depicts an example range vector within the range space. In the example graph 210, the parameter vector represents O-data for execution of a particular process defined as (rt, rc)=(34, err). This represents that a procedure was not successfully executed as represented by O-data including a runtime of 34 and a return-code of error. This execution can be associated with a user (e.g., the user that initiated execution of the procedure). Accordingly, the parameter vector can be described as defining variables in O-data that can be used to correlate with the X-data.

The example graph 212 depicts a range space based on the parameters of the example graph 210. In some examples, the range space can be described as a multi-dimensional space out of an array of ranges for each parameter. In the depicted example, the range space includes runtime ranges of [0-10], [10-20], [20-30], [30-40], and [>40] for the return-code range [OK+warning], and runtime ranges of [0-30] and [30, >40] for the return-code range [error+abort]. Accordingly, and as compared to the example graph 202, runtime ranges for the return-code range [error+abort] have been merged to provide more coarse-grained range cells.

The example graph 214 depicts an example range vector corresponding to the example parameter vector (rt, rc)=(34, err) of the example graph 210. Here, the range vector is provided as ([30, >40], [err, ab]), because rt=34 lands within the range [30, >40] and rc=err lands within the range [err, ab].

With reference to FIGS. 3A and 3B, development of a survey based on historical O-data and/or actual O-data is described in further detail. In some examples, historical O-data refers to O-data resulting from previous executions of computer-implemented services for users, at least some of which do not participate in a survey to provide X-data. In some examples, actual O-data (also referred to herein as ad hoc O-data) refers to O-data that is generated from executions of computer-implemented services for users that are to be invited to participate in a survey to provide X-data in view of the actual O-data. For example, it can be planned to issue a survey that is based on O-data generated within a pre-defined time period ahead of publishing of the survey.

In some implementations, a survey is defined based on input provided from a survey designer (e.g., the user 112 of FIG. 1). Example input includes, without limitation, an anonymity limit level, an expected return rate, and a number of users that the computer-based survey is to be sent to. In the example of FIGS. 3A and 3B, example input can include anonymity limit level=10, expected return rate=40%, and number of users to send the survey to =1000. The anonymity limit level indicates, for each range cell, a minimum number of users having O-data that lands in the range cell to maintain anonymity of users. For example, an anonymity limit level of 10 indicates that O-data (represented as a range vector) of at least 10 users is required to fall into each range cell in order to ensure anonymity of all users providing X-data.

FIG. 3A depicts an example statistical distribution 300. The example statistical distribution 300 accounts for the example parameters discussed above with reference to FIGS. 2A and 2B. In the example, of FIG. 3A, each range cell depicts a number of users associated with O-data that would land in the respective range cell. The statistical distribution is based on the example input in view of historical O-data and/or actual O-data. That is, in this example, the statistical distribution includes values normalized to 400 (i.e., 1000 invites with expected return rate of 40% results in X-data expected from 400 users). In the example of FIG. 3A, the statistical distribution indicates values of less than 10 for all range cells in the row corresponding to a result of fail (i.e., return-code range of [err, ab]). Consequently, these range cells (i.e., those having values of less than 10) violate the anonymity limit level.

To correct for this, two or more range cells are merged to provide more coarse-grained range cells that do not violate the anonymity limit level. FIG. 3B depicts the example statistical distribution of FIG. 3A including merged cells. In the example of FIG. 3B, the statistical distribution indicates values of greater than 10 for all range cells including those in the row corresponding to the result of fail (i.e., return-code range of [err, ab]). Accordingly, and in the example of FIGS. 3A and 3B, merger of range cells increases the statistical anonymity on the failure side to enable X-data and O-data correlation for failed procedures. At the same time, detail on the success side is not lost as the range cells are more fine-grained there. In this manner, implementations of the present disclosure enable tuning of range cells for respective parameter combinations.

As described in further detail herein, after the computer-based survey is provided to users and results of the survey, X-data, is received, the X-data can be correlated with O-data. More particularly, X-data can be analyzed for any selection on the range space and the ranges are related to O-data to enable further O-data analysis and correlation to the X-date. As described herein, the X-data is correlated to O-data based on range vectors that genericize the O-data with respect to users, while a parameter vector can be user-specific, as discussed herein.

FIG. 4A depicts an example design-time conceptual architecture 400 in accordance with implementations of the present disclosure. The design-time conceptual architecture 400 can be used to design a survey based on O-data prior to distributing the survey to users. In the example of FIG. 4A, the design-time conceptual architecture 400 includes a survey design user interface (UI) 402, a survey design application 404, and a survey runtime 406. The design-time conceptual architecture 400 also includes an O-data store 408, a survey design store 410, and a survey definition store 412.

In some implementations, a survey designer (e.g., the user 112 of FIG. 1) interacts with the survey design application 404 through the survey design UI 402. For example, the user can provide inputs including, but not limited to, an anonymity limit level, an expected return rate, and a number of users that the computer-based survey is to be sent to. In some implementations, for parameters of O-data, the survey design application 404 can generate an initial historical distribution to evaluate whether any combination of parameters or parameter ranges violates the anonymity limit level. For example, the survey design application 404 can retrieve O-data from the O-data store 408 and process the O-data to generate the initial historical distribution. The example historical distribution 300 of FIG. 3A, described above, can represent an example of an initial historical distribution provided by the survey design application 404.

In some implementations, the initial historical distribution is displayed to the survey designer in the survey design UI 402. In some examples, the survey designer can provide input indicating two or more range cells of the initial historical distribution that are to be merged to achieve the anonymity limit level. For example, in response to the historical distribution 300 of FIG. 3A being displayed, the survey designer can provide input to the survey design UI 402 to select the parameter ranges of [0-10], [10-20], and [20-30] of the parameter range [error, abort] (i.e., failure) to be merged to provide a parameter range of [0-30]. As another example, the survey designer can provide input to the survey design UI 402 to select the parameter ranges of [30-40] and [>40] of the parameter range [error, abort] (i.e., failure) to be merged to provide a parameter range of [30, >40]. This results in the example historical distribution 302 of FIG. 3B. Accordingly, the range cells of the resulting distribution are subsequently used to correlate O-data and X-data resulting from the survey.

Accordingly, design of the survey can be an iterative process. In general, and as described in detail herein, an expected sample size per range cell is determined (e.g., the statistical distribution of FIG. 3A), and it is determined whether there are range cells with too few expected feedback responses (e.g., a number of expected feedback results that is less than the anonymity limit level. If the expected sample size per range cell is too small, the anonymity limit level can be adjusted (e.g., reduce from 10 to 5), a number of parameter ranges can be reduced, and/or range cells can be merged (e.g., as discussed above with reference to FIGS. 3A and 3B). In some examples, if the statistical sample is big and the analysis shows that, for each range cell a relatively high number of feedback results are expected the number of ranges can be increased (i.e., more fine-grained parameter ranges) to enable a more precise correlation, and/or range cells with relatively high expected feedback results can be split into smaller range cells.

In some implementations, the user can provide input to the survey design application 404 through the survey design UI 402 indicating questions that are to be included in the survey. In some examples, questions can include, without limitation, general questions, range cell-specific questions, and/or questions that are defined to be not applicable for certain range cell(s).

Example questions can be directed to a computer-implemented service and can include, without limitation, [Is the new UI an improvement?], [Rate the UI], [Rate the runtime], and [How well does the procedure fit into your environment?]. In some examples, the user can provide input indicating response options for each of the questions. Example response options can include values within a range (e.g., 0 to 5) where higher values indicate agreement or positivity and lower values indicate disagreement or negativity. In some examples, questions and/or response options can be selected from respective sets of questions and response options provided in the survey design store 410. In this manner, pre-defined questions and/or response options can be selected to avoid original authoring of each by the survey designer.

In some implementations, the survey is stored as a computer-readable file that is stored as a survey definition in the survey definition store 412. For example, the survey design application 402 can provide the survey definition to the survey runtime 406, which stores the survey definition in the survey definition store 412. In some examples, the survey definition includes the questions and the range space defined for O-data.

Figure 4B:
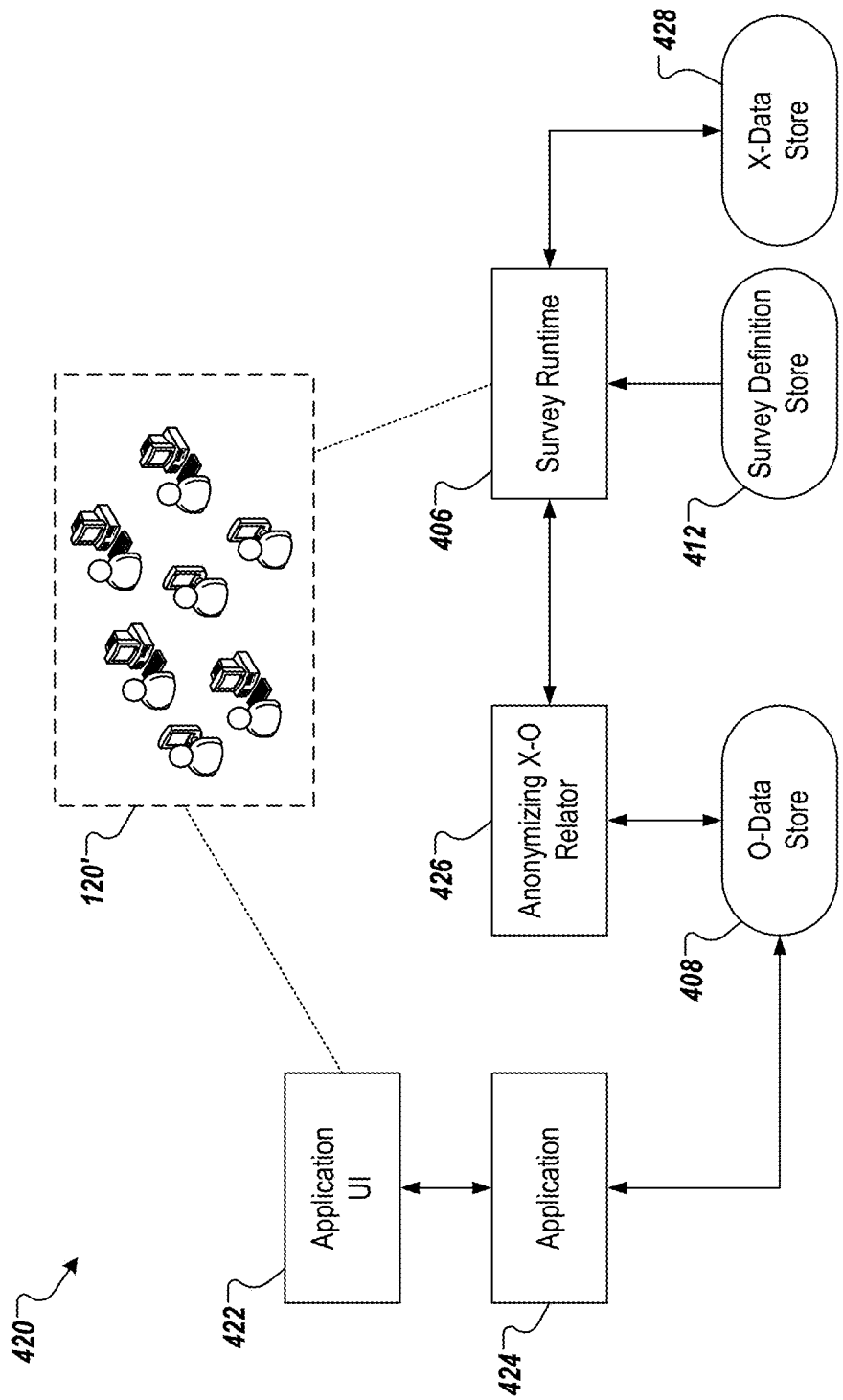
FIG. 4B depicts an example run-time conceptual architecture in accordance with implementations of the present disclosure.

FIG. 4B depicts an example run-time conceptual architecture 420 in accordance with implementations of the present disclosure. The example run-time conceptual architecture 420 includes an application UI 422, an application 424, an anonymizing X-O relator (AXOR) 426, and the survey runtime 406. The example run-time conceptual architecture 420 also includes the O-data store 408, the survey definition store 412, and an X-data store 428.

In some examples, users in the user group 120 (of FIG. 1) interact with the application 424 through the application UI 422. In some examples, the application 424 provides one or more computer-implemented services that provide functionality for an enterprise (e.g., an employer of users of the user group 120). In some examples, users can initiate execution of functionality of the computer-implemented services through the application UI 422, which execution results in generation of O-data that is stored in the O-data store 408. For example, a first user can initiate execution of a procedure, which results in O-data of [34, warn], and a second user can initiate execution of the procedure, which results in O-data of [34, err] (e.g., as described by way of example with reference to FIGS. 2A and 2B).

At some point after or during user interaction with the application 424 and generation of O-data, users of the group of users 120 are requested to complete a survey. In some examples, when the application 424 is reaches an end point associated with an interaction of a user, the survey can be triggered to the user. Example end points can include, but are not limited to, a transaction initiated by the user is complete, a workflow initiated be the user is complete, a configuration executed by the user is complete, a patch is deployed by the user. In some examples, a component (e.g., of the application 424) determines whether the user is to be sent the survey. For example, instead of sending the survey at each instance of an end point being achieved, it can be determined on a user-by-user basis as to whether the survey is to be sent based on selection criteria. Example selection criteria can include, without limitation, a frequency that a user has been asked to partake in surveys (e.g., avoid asking the same user too often), a limit on a number of users (e.g., ask only 5% of users), and a distribution of users (e.g., users selected from different regions).

In some implementations, if a user is to be invited to partake in the survey, the application 424 can transmit a message (e.g., email, instant message) to users of the user group 120, the message inviting the users to participate in the survey and providing a link (e.g., uniform resource locator (URL)) to the survey. In some examples, in response to a user selecting the link, the survey definition is retrieved from the survey definition store 412, and an instance of the survey is provided in the survey runtime 406 to receive input from the user. The input provided by the user is stored as X-data in the X-data store 428.

In further detail, the survey runtime 406 retrieves the survey definition from the survey definition store 412 and the O-data range space is determined from the survey definition. For a user partaking in the survey, user-specific O-data representing the user's interaction with the computer-implemented service is retrieved from the O-Data store 408 (e.g., O-data representing the transaction, workflow, configuration, and/or patch performed by the user). The user-specific O-data is provided as a parameter vector. For example, and with reference to the examples above, the parameter vector [34, warn] would be provided for the first user, the parameter vector [34, err] would be provided for the second user (i.e., assuming both the first user and the second user are each participating in the survey).

In accordance with implementations of the present disclosure, the parameter vector is translated into a range vector based on the range space defined for the survey. For example, the parameter vector is plotted in the range space to determine the range cell that the parameter vector lands in, and the range vector is determined from the range cell. For example, and with reference to the examples above, the parameter vector [34, warn] for the first user would result in a range vector of ([30-40], [OK, warn]), and the parameter vector [34, err] for the second user would result in a range vector of ([30, >40], [err, ab]) (see, e.g., the examples of FIGS. 2A and 2B).

In some implementations, in inviting a user to partake in the survey, the URL includes a unique survey identifier that prevents the user from submitting the same survey multiple times. It can be noted that the survey identifier is neither related to the user or the parameter vector(s) provided for the user. Instead, the survey identifier is only related to the range vector(s). In this manner, the survey result (X-data) associated with the range vector is stored when the survey is submitted by the user. In some examples, the X-data entered by the user through the survey is stored in the X-data store 428 together with the range vector that was determined from the parameter vector. In some examples, a range vector can be considered a key that identifies survey results. For such keys, a certain key-value=range vector instance will have "anonymity level limit" number of feedbacks at the end of the survey.

In some implementations, an analyst (e.g., the survey designer) can analyze the X-data in view of the O-data by correlating the X-data to O-data, as described herein. In some examples, after a number of completed surveys meets or exceeds the return rate defined by the survey designer, the survey runtime 406 can automatically notify the analyst that the X-data and O-data are available for analysis in an anonymity-preserving manner. In some implementations, the AXOR 426 correlates the X-data and the O-data based on the parameter ranges defined during the design-time of the survey, as described herein. In some examples, the AXOR 426 retrieves range space definitions for the survey and reads parameter vector for respective users from the O-data store 408, and generates range vectors that are used to correlate the X-data and O-data, as described in further detail herein.

Figure 5A:
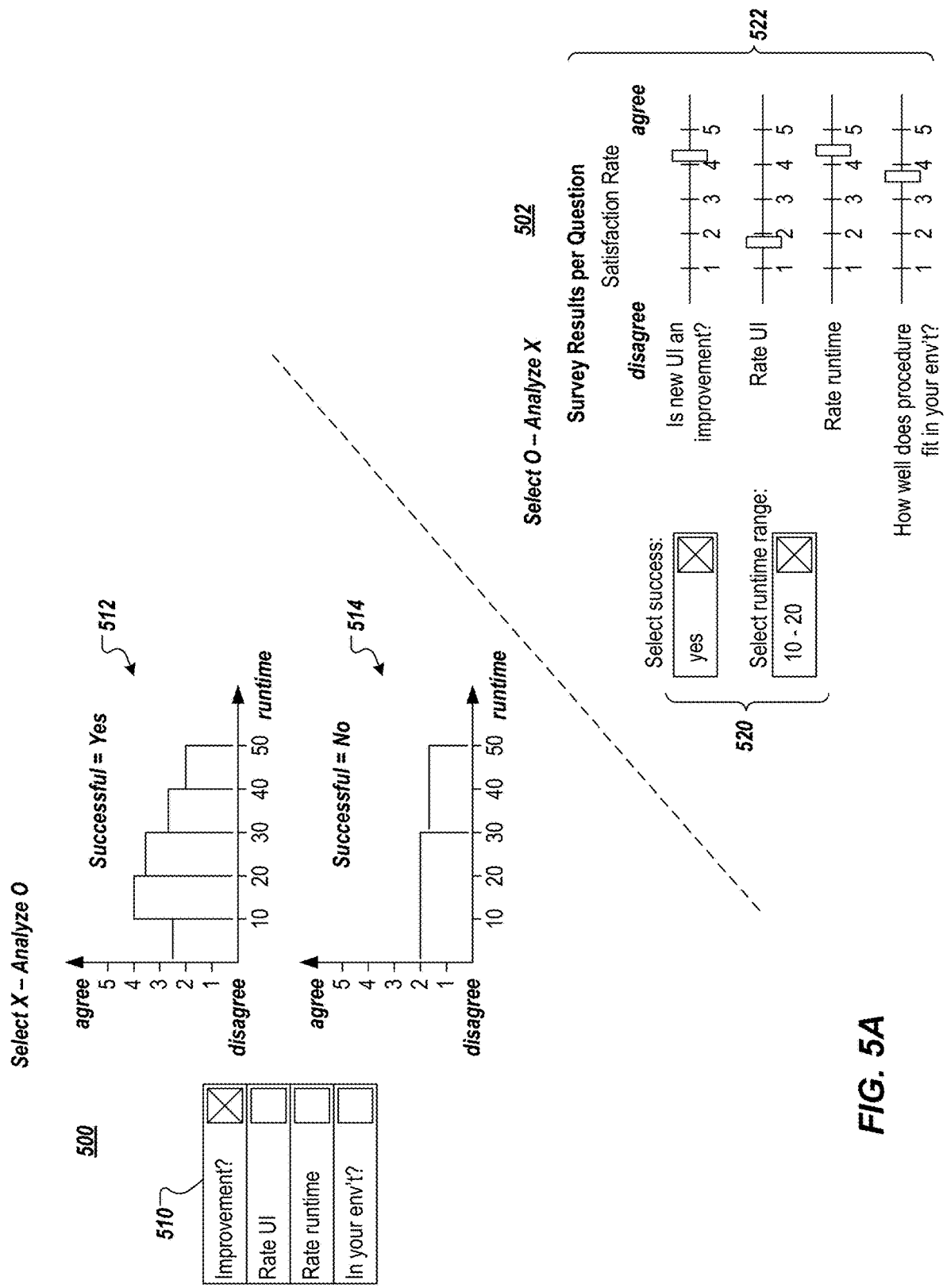
FIGS. 5A-5C depict graphical representations of example results analytics in accordance with implementations of the present disclosure.
Figure 5B:
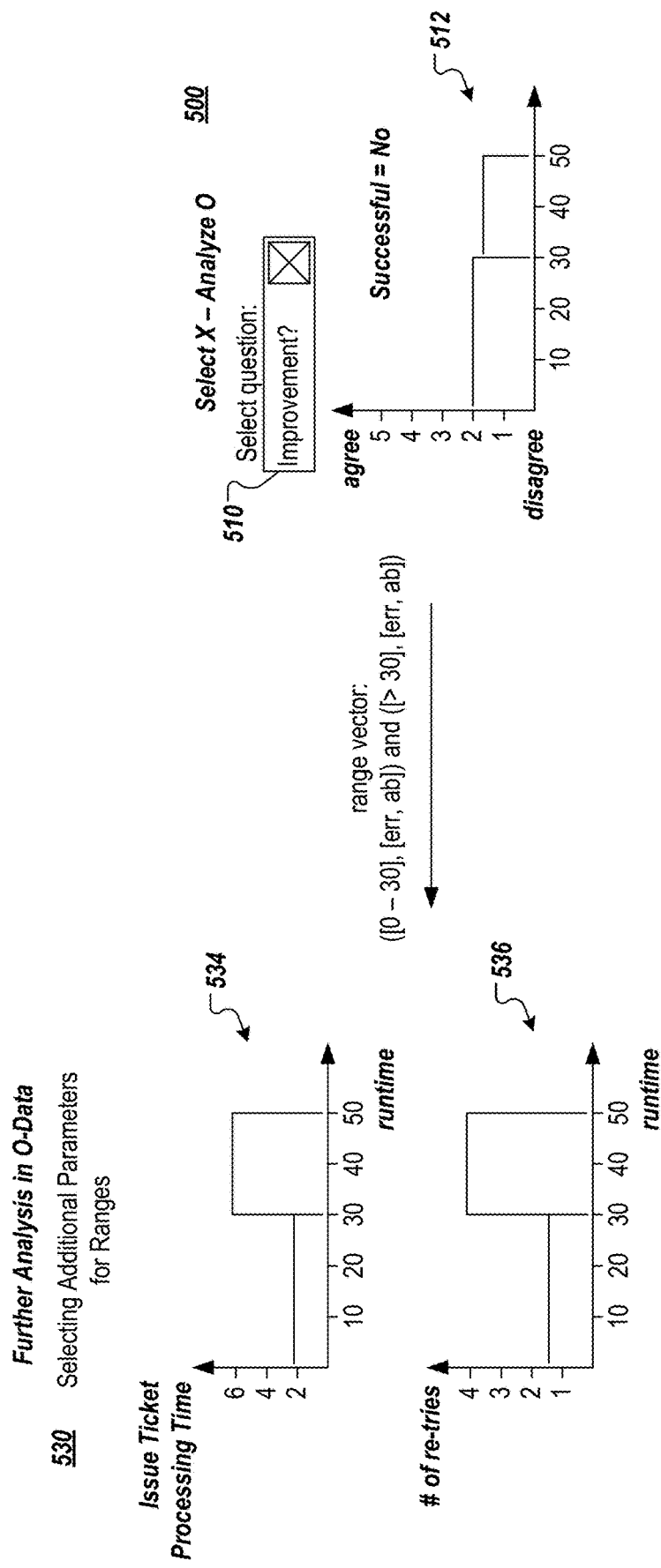
Figure 5C:
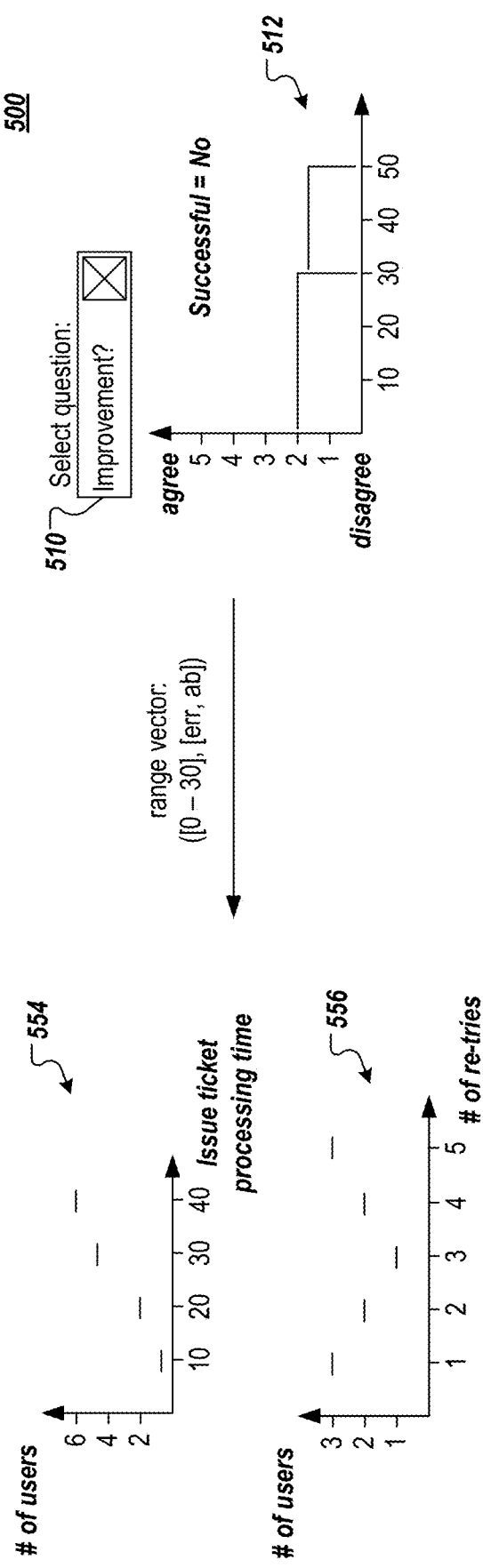

To help illustrate implementations of the present disclosure, a non-limiting example is detailed herein, which is further detailed in FIGS. 5A-5C, described herein. The non-limiting example includes a new technical configuration tool that is deployed to a computer-implemented services, and the development team wants to evaluate how users rate the configuration tool with respect to:

Is the new version an improvement?
Rate the UI
Rate the runtime
Does the procedure fit to the customer's environment?

For the evaluation, the technical data the team wants to have O-data correlated with X-data received from the survey, the O-data including runtime of the procedure and return-code of the procedure (i.e., was it successful or not). In this example, the runtime is typically below 50 and has a peak at 25. The success rate is approximately 90%.

In view of this, a survey is designed based on historical information indicating that a 40% return rate can be expected. A granularity for the evaluation is defined to enable a 1000 participant group to give meaningful feedback per group. In this example, and as discussed in examples above, return-code is grouped to (ok+warn) and (error+abort). In this manner, "successful or not" can be decided. With regard to runtime, parameter ranges of 0-10, 10-20 and so are defined as sufficiently fine-grained.

However, it is to be ensured that users providing X-data cannot be discerned. To ensure this, a historical data distribution is determined (see, e.g., FIG. 3A) and it is determined whether the parameter ranges and sample size would guarantee statistical anonymity based on an anonymity limit level of 10 (i.e., at least 10 users per range cell. In looking at the historical data distribution, it is determined that the number of procedures with error would not reach a level where anonymity could be guaranteed (e.g., as depicted in FIG. 3A). In response, range cells are adjusted to enlarge problematic range cells (see, e.g., FIG. 3B). The survey can then be executed and user anonymity preserved.

FIGS. 5A-5C depict graphical representations of example results analytics in accordance with implementations of the present disclosure. The examples of FIGS. 5A-5C are based on the example discussed above. In accordance with implementations of the present disclosure, the survey results can be evaluated in multiple ways. For example, this can include, without limitation, survey-data-only and survey data and additional O-data. In these examples, survey-data-only refers to O-data used to design the survey (i.e., the parameters us to provide the parameter ranges and corresponding range cells) and the X-data resulting from the survey, while survey data and additional O-data refers to O-data used to design the survey (i.e., the parameters us to provide the parameter ranges and corresponding range cells) and the X-data resulting from the survey, as well as O-data not used to design the survey.

With respect to survey-data-only, survey results can be analyzed against the parameters with the defined range space on data stored in the survey DB (e.g., X-data, range-vectors). This enables evaluation of the survey results in the range space (i.e., along the dimensions of the range space) and per range cell. Here, the O-data is only available as the range vectors.

Examples of survey-data-only are depicted in FIG. 5A, which includes a Select X-Analyze O view 500 and a Select O-Analyze X view 502 (e.g., views that can be displayed in a UI). In some examples, the Select X-Analyze O view 500 enables a user to select X-data to analyze O-data that correlates to the selected X-data, while the Select O-Analyze X view 502 enables the user to select O-data to analyze X-data that correlates to the selected O-data.

In the example of FIG. 5A, and in the view 500, the X-data for a question regarding improvement (e.g., [Is the new UI an improvement?]) is selected using a UI element 510. In response, the X-data (e.g., response values ranging from 0 to 5) is correlated to O-data in graphs 512, 514. The graph 512 correlates the X-data to O-data instances indicating return-codes of OK or warn (e.g., success) across the parameter ranges defined for those return-codes, while the graph 514 correlates the X-data to O-data instances indicating return-codes of error or abort (e.g., fail) across the parameter ranges defined for those return-codes. The parameter ranges of the graphs 512, 514 correspond to those defined for the respective parameter ranges of the return-codes and the parameter ranges of the runtimes, as described above with reference to FIGS. 3A and 3B. Consequently, the graph 512 provides a more fine-grained correlation of the X-data and O-data than the graph 514.

In the example of FIG. 5A, and in the view 502, the O-data is selected using a UI element 520. Here, the UI element 522 corresponds to the O-data used to design the survey (e.g., the O-data described above with reference to FIGS. 3A and 3B). In response, graphical representations 422 of X-data representing user responses to the survey are depicted. In some examples, each graphical representation 422 is provided as an average of the X-data received for a respective question. For example, for the question [Is the new UI an improvement?], the X-data is represented as an average of approximately 4.3 across all users providing a response and having O-data in the parameter range of success (e.g., [OK, warn]) and in the runtime parameter range of [10-20].

With respect to survey data and additional O-data, implementations of the present disclosure enable additional O-data to be used in the analysis, the additional O-data being O-data that was not used during design-time of the survey. That is, the additional O-data is not used to define parameter ranges in a range space. In some implementations, the O-data store 408 can be queried for additional O-data based on X-data and range vector. In some examples, the query is executed in the database (i.e., the O-data store 408) to join other O-data to the defined range-space, dimensions and range cells using the range vector.

FIG. 5B depicts an example of additional O-data being retrieved from the O-data store. The example of FIG. 5B depicts additional O-data of ticket processing time and number of retries can be evaluated. In the depicted example, the additional O-data is evaluated against parameter ranges for runtime, which are provided for failures (i.e., unsuccessful executions) as depicted in the view 500 of FIG. 5A. In this example, a range vector that is based on the parameter ranges of the view 500 are used to query the O-data store (e.g., ([0-30], [err, ab]) and ([>30], [err, ab])), which results in additional O-data of ticket processing time and number of retries to be returned and graphically depicted in a view 530, which includes graphs 534, 536, respectively.

FIG. 5C depicts another example of additional O-data being retrieved from the O-data store. The example of FIG. 5C illustrates that additional statistics can be selected from the O-data regarding a single range-cell (e.g., satisfaction is low for users with unsuccessful executions and runtimes in the parameter range [0-30]). Here, additional O-data related to this can be queried from the O-data store to show how many users had a ticket-runtime of 10, 20, 30, 40 or more hours. (e.g. a long ticket runtime would explain a low satisfaction ratio). In this example, a range vector that is based on the parameter ranges of the view 500 are used to query the O-data store (e.g., ([0-30], [err, ab])), which results in additional O-data of number of users per ticket processing time and number of users per number of retries to be returned and graphically depicted in a view 550, which includes graphs 554, 556, respectively. This analysis can show how often certain users did a re-try (e.g., gave up early, or had seriously tried to resolve the issue).

Figure 6:
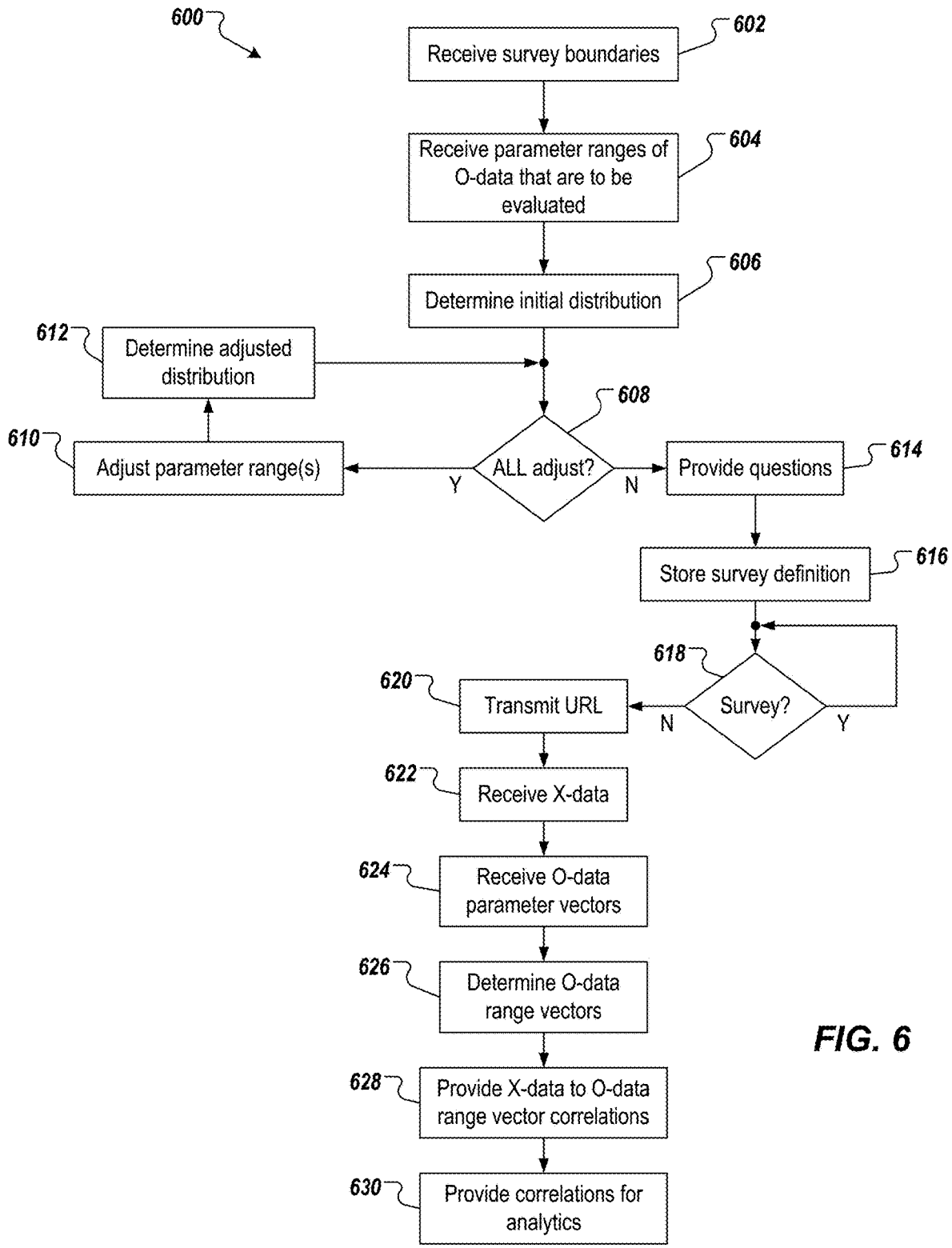
FIG. 6 depicts an example process that can be executed in accordance with implementations of the present disclosure.

FIG. 6 depicts an example process 600 that can be executed in accordance with implementations of the present disclosure. In some examples, the example process 600 is executed preserving user anonymity in correlating X-data and O-data in analytics of computer-implemented services.

Survey boundaries are received (602). Example survey boundaries include expected return rate, number of users to be surveyed, and an anonymity limit level (ALL). For example, and as described herein, a survey designer (e.g., the user 112 of FIG. 1) interacts with the survey design application 404 through the survey design UI 402 to input survey boundaries. Parameter ranges of O-data are received (604). For example, and as described herein, the survey designer can provide input to the survey design application 404 through the survey design UI 402 to define parameter ranges of O-data. Example parameter ranges that can be input are described herein (e.g., as depicted in FIG. 3A).

An initial distribution is determined (606). For example, and as described herein with reference to FIG. 3A, an initial distribution can be determined based on the parameter ranges and historical O-data (e.g., normalized based on expected return rate and number of users to be surveyed). It is determined whether one or more parameters ranges are to be adjusted based on the anonymity limit level (608). For example, the initial distribution can be reviewed to determine whether any range cells violate the anonymity limit level, indicating that the range cell should be made larger (e.g., merged with another range cell). As another example, the initial distribution can be reviewed to determine whether a distribution of a range cell significantly exceeds the anonymity limit level (e.g., indicating that the range cell can be split into multiple range cells to provide finer-grained range cells). If one or more parameters ranges are to be adjusted, the one or more parameter ranges are adjusted (610), an adjusted historical distribution is determined (612), and the example process 600 loops back. For example, range cells are merged and/or a range cell is split.

If one or more parameters ranges are not to be adjusted, questions are provided (614). For example, and as described herein, the survey designer can provide input to the survey design application 404 through the survey design UI 402 indicating questions that are to be included in the survey. A survey definition is stored (616). For example, and as described herein, the survey definition is stored in the survey definition store 412 and includes a set of questions and a range space based on the parameter ranges.

It is determined whether the survey has been triggered (618). For example, and as described herein, whether the survey has been triggered can be determined on a user-by-user basis. In some examples, in response to an interaction with the computer-implemented service (e.g., application) achieving an end point, the survey can be triggered for the user associated with the interaction. If the survey has not been triggered, the example process 600 loops back.

If the survey has been triggered, a URL is transmitted (620). For example, a message is transmitted to a user, for which the survey has been triggered, the URL providing a link to the computer-based survey. X-data is received (622). For example, for each user participating in the computer-based survey, X-data is received and represents user responses to questions in the survey. O-data parameter vectors are received (624). For example, and as described herein, for each user providing X-data, an O-data parameter vector is retrieved from the O-data store 408, the O-data parameter vector representing the specific interaction the respective user experienced with the computer-implemented service.

O-data range vectors are determined (626). For example, and as described herein, each O-data parameter vector is mapped to the range space to provide a respective O-data range vector. Each O-data range vector genericizing the interaction the respective user experienced with the computer-implemented service.

X-data to O-data correlations are provided (628). For example, and as described herein, the X-data provided by a user is correlated to an O-data range vector determined for the user (e.g., a pair [X-data, O-data range vector]) is provided. The correlation is absent any association with the user. The X-data to O-data correlations are provided for analytics (630).

Figure 7:
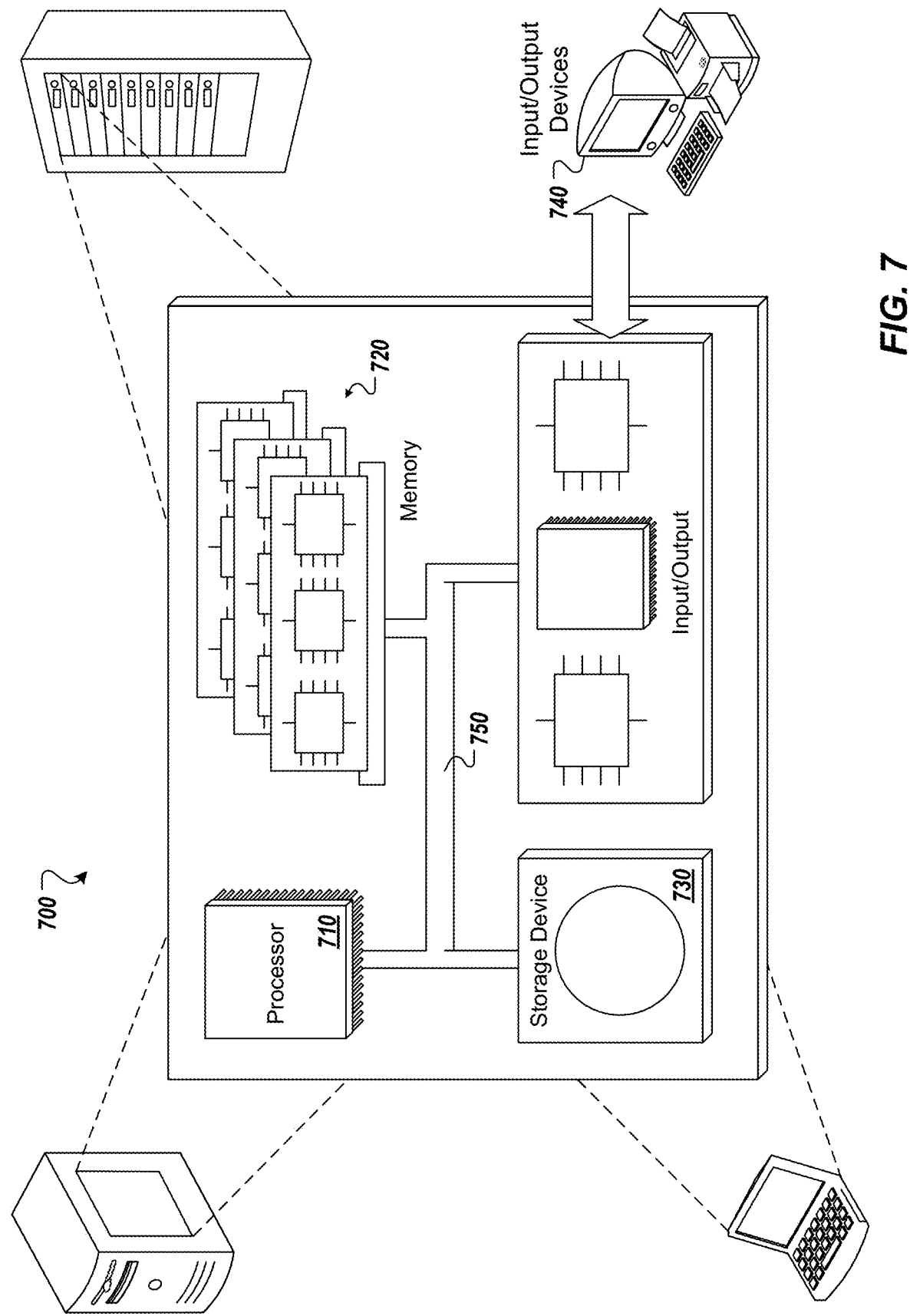
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In some implementations, the memory 720 is a non-volatile memory unit. The storage device 730 is capable of providing mass storage for the system 700. In some implementations, the storage device 730 is a computer-readable medium. In some implementations, the storage device 730 may be a floppy disk device, a hard disk device, an optical disk device, or a tape device. The input/output device 740 provides input/output operations for the system 700. In some implementations, the input/output device 740 includes a keyboard and/or pointing device. In some implementations, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for preserving user anonymity in correlating experience data (X-data) and operational data (O-data) in analytics of computer-implemented services, the method being executed by one or more processors and comprising:
   determining, by an anonymity-preserving data analysis platform, an initial distribution based on a set of survey boundaries and historical O-data, the historical O-data being generated through execution of a computer-implemented service, the historical distribution comprising a first set of parameter ranges and a second set of parameter ranges defining a set of range cells;
   adjusting, by the anonymity-preserving data analysis platform, one or more parameters ranges of at least one of the first set of parameter ranges and the second set of parameter ranges;
   determining, by the anonymity-preserving data analysis platform, an adjusted distribution defining a range space for a computer-based survey;
   receiving, by the anonymity-preserving data analysis platform, X-data from a set of users participating in the computer-based survey, the X-data comprising responses of users in the set of users provided to the computer-based survey;
   providing a set of X-data to O-data range vector correlations; and
   executing analytics of the computer-implemented service based on the set of X-data to O-data range vector correlations.

2. The method of claim 1, wherein each X-data to O-data range vector correlation is provided by:
   determining an O-data parameter vector for a user in the set of users, the O-data parameter vector corresponding to X-data provided by the user,
   determining an O-data range vector by mapping the O-data parameter vector to the range space of the adjusted distribution, and
   correlating the X-data to the O-data range vector.

3. The method of claim 1, wherein the adjusting one or more parameters ranges of the initial distribution is executed in response to determining that each of the one or more parameter ranges exceeds an anonymity limit level.

4. The method of claim 1, wherein adjusting the one or more parameter ranges comprises merging at least two parameter ranges.

5. The method of claim 1, wherein adjusting the one or more parameter ranges comprises splitting a parameter range.

6. The method of claim 1, wherein the user is identifiable from the O-data parameter vector and is unidentifiable from the O-data range vector and X-data.

7. The method of claim 1, wherein executing analytics comprises querying an O-data database for additional O-data at least partially based on the O-data range vector.

8. A non-transitory computer-readable storage medium coupled to one or more processors and having instructions stored thereon which, when executed by the one or more processors, cause the one or more processors to perform operations for preserving user anonymity in correlating experience data (X-data) and operational data (O-data) in analytics of computer-implemented services, the operations comprising:
- determining, by an anonymity-preserving data analysis platform, an initial distribution based on a set of survey boundaries and historical O-data, the historical O-data being generated through execution of a computer-implemented service, the historical distribution comprising a first set of parameter ranges and a second set of parameter ranges defining a set of range cells;
- adjusting, by the anonymity-preserving data analysis platform, one or more parameters ranges of at least one of the first set of parameter ranges and the second set of parameter ranges;
- determining, by the anonymity-preserving data analysis platform, an adjusted distribution defining a range space for a computer-based survey;
- receiving, by the anonymity-preserving data analysis platform, X-data from a set of users participating in the computer-based survey, the X-data comprising responses of users in the set of users provided to the computer-based survey;
- providing a set of X-data to O-data range vector correlations; and
- executing analytics of the computer-implemented service based on the set of X-data to O-data range vector correlations.

9. The computer-readable storage medium of claim 8, wherein each X-data to O-data range vector correlation is provided by:
- determining an O-data parameter vector for a user in the set of users, the O-data parameter vector corresponding to X-data provided by the user,
- determining an O-data range vector by mapping the O-data parameter vector to the range space of the adjusted distribution, and
- correlating the X-data to the O-data range vector.

10. The computer-readable storage medium of claim 8, wherein the adjusting one or more parameters ranges of the initial distribution is executed in response to determining that each of the one or more parameter ranges exceeds an anonymity limit level.

11. The computer-readable storage medium of claim 8, wherein adjusting the one or more parameter ranges comprises merging at least two parameter ranges.

12. The computer-readable storage medium of claim 8, wherein adjusting the one or more parameter ranges comprises splitting a parameter range.

13. The computer-readable storage medium of claim 8, wherein the user is identifiable from the O-data parameter vector and is unidentifiable from the O-data range vector and X-data.

14. The computer-readable storage medium of claim 8, wherein executing analytics comprises querying an O-data database for additional O-data at least partially based on the O-data range vector.

15. A system, comprising:
- a computing device; and
- a computer-readable storage device coupled to the computing device and having instructions stored thereon which, when executed by the computing device, cause the computing device to perform operations for preserving user anonymity in correlating experience data (X-data) and operational data (O-data) in analytics of computer-implemented services, the operations comprising:
  - determining, by an anonymity-preserving data analysis platform, an initial distribution based on a set of survey boundaries and historical O-data, the historical O-data being generated through execution of a computer-implemented service, the historical distribution comprising a first set of parameter ranges and a second set of parameter ranges defining a set of range cells;
  - adjusting, by the anonymity-preserving data analysis platform, one or more parameters ranges of at least one of the first set of parameter ranges and the second set of parameter ranges;
  - determining, by the anonymity-preserving data analysis platform, an adjusted distribution defining a range space for a computer-based survey;
  - receiving, by the anonymity-preserving data analysis platform, X-data from a set of users participating in the computer-based survey, the X-data comprising responses of users in the set of users provided to the computer-based survey;
  - providing a set of X-data to O-data range vector correlations; and
  - executing analytics of the computer-implemented service based on the set of X-data to O-data range vector correlations.

16. The system of claim 15, wherein each X-data to O-data range vector correlation is provided by:
- determining an O-data parameter vector for a user in the set of users, the O-data parameter vector corresponding to X-data provided by the user,
- determining an O-data range vector by mapping the O-data parameter vector to the range space of the adjusted distribution, and
- correlating the X-data to the O-data range vector.

17. The system of claim 15, wherein the adjusting one or more parameters ranges of the initial distribution is executed in response to determining that each of the one or more parameter ranges exceeds an anonymity limit level.

18. The system of claim 15, wherein adjusting the one or more parameter ranges comprises merging at least two parameter ranges.

19. The system of claim 15, wherein adjusting the one or more parameter ranges comprises splitting a parameter range.

20. The system of claim 15, wherein the user is identifiable from the O-data parameter vector and is unidentifiable from the O-data range vector and X-data.

* * * * *